(12) United States Patent
Dugelay

(10) Patent No.: US 6,643,383 B1
(45) Date of Patent: Nov. 4, 2003

(54) METHOD FOR HIDING BINARY DATA IN A DIGITAL IMAGE

(75) Inventor: Jean-Luc Dugelay, Cannes (FR)

(73) Assignee: Institut Eurecom, Sophia-Antiopolis (FR)

(*) Notice: Subject to any disclaimer, the term of this patent is extended or adjusted under 35 U.S.C. 154(b) by 0 days.

(21) Appl. No.: 09/423,266
(22) PCT Filed: Apr. 4, 1999
(86) PCT No.: PCT/FR99/00485
§ 371 (c)(1),
(2), (4) Date: Nov. 5, 1999
(87) PCT Pub. No.: WO99/45696
PCT Pub. Date: Sep. 10, 1999

(30) Foreign Application Priority Data

Mar. 5, 1998 (FR) .............................................. 98 04083

(51) Int. Cl.⁷ ................................................. G06K 9/00
(52) U.S. Cl. ....................................... 382/100; 358/3.28
(58) Field of Search ................................. 382/100, 181, 382/196, 218, 232, 239, 249, 112, 228, 284; 380/28, 54, 51; 355/40; 358/403, 3.28; 348/473; 705/1, 54; 713/167, 176

(56) References Cited

U.S. PATENT DOCUMENTS

| | | | | |
|---|---|---|---|---|
| 5,502,576 A | * | 3/1996 | Ramsay et al. ............. 358/403 |
| 5,636,292 A | * | 6/1997 | Rhoads ........................ 235/382 |
| 5,673,316 A | * | 9/1997 | Auerbach et al. ............. 705/51 |
| 5,751,854 A | * | 5/1998 | Saitoh et al. .................. 380/51 |
| 5,819,289 A | * | 10/1998 | Sanford et al. ............. 380/243 |
| 5,946,414 A | * | 8/1999 | Cass et al. .................. 382/183 |
| 5,974,548 A | * | 10/1999 | Adams ........................ 358/448 |
| 6,240,185 B1 | * | 5/2001 | Van Wie et al. ............ 380/205 |

* cited by examiner

*Primary Examiner*—Jayanti K. Patel
(74) *Attorney, Agent, or Firm*—George O. Saile; Stephen B. Ackerman; Billy Knowles

(57) ABSTRACT

A method for hiding primary digital information in an initial digital document begins by first breaking down the initial document by determining a reference digital document as a function of the initial digital document by a fractal transformation method. Secondary digital information is created as a function of the primary digital information to be hidden and the reference digital document. A modified image is computed by the sum of the reference digital document and the secondary digital information such that the modified digital document approximates the initial document but integrating substantially indiscernible the primary digital information to be hidden. The method enables retrieval of digital information hidden in a multimedia document in a dual manner. The method is based on the concept of auto-similarity and ensures that the input information is not visible but finally be retrieved without providing knowledge of the original documents.

51 Claims, 3 Drawing Sheets

METHOD FOR HIDING BINARY DATA IN A DIGITAL IMAGE

BACKGROUND OF THE INVENTION

1. Technical Field of the Invention

The present invention relates to a process for hiding a binary data inside a numerical multimedia document, such as this data represents an image, textual data or the logo of a company in gray levels, to be retrieved from the modified document. The present invention, further, relates to applications which can take advantage of the process for hiding data into a numerical image.

2. Background Art

Numerical imaging is certainly the first field of multimedia applications for which there is an important need to introduce binary data into an image. Various techniques exist for hiding binary data, for example "watermarking an application, where digitized documents are marked in order to prove ownership or content authentication.

Cryptographic techniques exist that have the purpose of creating an "unreadable" document. This does not correspond to the technical background being considered in this application where the original document must remain readable and visible.

Generally speaking, the known techniques for hiding data present some drawbacks:

The quality of the image degrades, as does the ability to control the degradation;

The image can loose clarity, which results in the retrieval of unreliable information;

Some approaches require the use of the original image in order to retrieve the hidden binary information. The hidden data cannot therefore be recovered from the modified document alone. This is a major drawback because, it is important in many applications, to retrieve the embedded information without reference to the original document—a blind retrieval system.

OBJECTS OF THE INVENTION

An object of the present invention is to achieve a process for hiding binary information inside a document, while preserving image quality.

It is, further, an object of the present invention to provide a process for hiding information inside a fixed or video image, in color or gray levels, and more generally in any multimedia document, without jeopardizing the quality of the original document. In particular, when hiding binary data within a fixed or video image, it is important to prevent any loss in the visual clarity or audio quality, or at least to efficiently limit the distortion.

The aim of limiting the distortion introduced when adding information to a document requires the resolution of a paradox because, generally, the more information is introduced within a given image, the more distortion occurs.

Another object of the present invention is to in achieve a process for hiding information, which permits the retrieval of hidden data, without the original document, even when the modified document has been subject of a wide range of non destructive transformations.

Another object of this invention is to provide a process that allows for adding hidden information while maintaining the integrity of the original. In fact a great deal of hidden information maybe added without degrading the original.

Still, another object of this invention is to provide a process for concealing information that is easily changed or corrected when new information is added to the document.

Further still, another object of this invention is to provide a method for hiding data in any multimedia document (image, audio, video).

Additionally, an object of this invention is to provide a process for hiding of any kind of numerical information inside a multimedia document, for more security purposes. The particular use of the process of this invention will be determined by the practical requirements of the data which is to be introduced within the document.

To achieve at least one of these object, a process for hiding a primary numerical information ($I_{inf1}$) inside an initial numerical document, in particular a multi-media document ($I_{orig}$), includes the steps of:

generating a numerical reference document ($I_{ref}$) which is a function of the initial numerical document ($I_{orig}$), and secondary numerical information ($I_{inf2}$) which is a function of the primary numerical information to hide. The sum of the numerical document of reference ($I_{ref}$) and the secondary numerical information ($I_{inf2}$) creates a modified document ($I'_{orig}$) very close to the initial document ($I_{orig}$);

inserting said secondary numerical information ($I_{inf2}$) within the original document, by computing a modified picture ($I'_{orig}$) composed of the sum of the numerical document of reference ($I_{ref}$) and secondary numerical information ($I_{inf2}$), in order to obtain a modified numerical document ($I'_{orig}$) close to the initial document ($I_{orig}$) but including without any visual distortion the primary information ($I_{inf1}$) to be introduced within the document.

In a preferred embodiment of this invention, the value of each pixel of the modified document ($I'_{orig}$) is included within the range defined by the value computed in the numerical document of reference ($I_{ref}$) and the value given by the initial document ($I_{orig}$).

A fractal transformation is used in the preferred embodiment of this invention for determining the numerical document of reference ($I_{ref}$) from the initial document ($I_{orig}$). The fractal transformation includes the following steps:

splitting the initial document ($I_{orig}$) in a set of primitives RANGE (i) covering the whole initial document;

extracting from the initial document ($I_{orig}$) a set of primitives DOMAIN(j), in order to create a basic codebook (Dbase) of primitives DOMAIN(j);

determining from the dictionary of basic DOMAIN primitives a final codebook (Dfinal) of additional DOMAIN primitives, by applying to the basic primitives, a set of local geometric and/or photometric transformations;

matching each basic RANGE(i) primitive with a DOMAIN(j) primitive of the (Dbase) codebook, in such a way that each RANGE(i) primitive be equal to a transformed DOMAIN(j) primitive via an elementary transformation $w_i$, plus an error ($\epsilon_i$), which allows the numerical information ($I_{inf1}$) to be embedded. The image which is composed by the set of RANGE primitives, computed from a DOMAIN primitive itself extracted from the final codebook (Dfinal), is denoted $WI_{orig}$ (or attractor A in the particular case where the selected context correspond to a contractive Iterated Function System (IFS) code as explained later in this document).

In a second embodiment of this invention, a lossy coding approach allows the computation of the numerical document of reference ($I_{ref}$) from the initial document ($I_{orig}$). From the perspective of numerical imaging applications, a JPEG coding can be used, or a process based on a reduction of the resolution to the initial document ($I_{orig}$).

In order to generate the secondary numerical information ($I_{inf2}$) from the primary numerical information ($I_{inf1}$) that is to hidden, the fractal analysis involves the computing of a gap image. The gap image is computed as the difference of the initial document ($I_{orig}$) and a fractal transformation code associated with the initial document ($I_{orig}$), as given by the formula:

$$GAP = I_{orig} - WI_{orig}.$$

If the particular code is a contractive code then the gap image is the difference between the initial document ($I_{orig}$) and an attractor (A), as given in the formula:

$$GAP = I_{orig} - A$$

The attractor (A) is determined from the fractal code W associated to the original image ($I_{orig}$). For each pixel (x,y) of the original document, the secondary numerical information to hide ($I_{inf2}$) is determined from the gap image difference (GAP) between the initial document $I_{orig}$ (given) and the numerical document of reference $I_{ref}$ (computed). A binary relationship between the gap image (GAP) and the primary numerical information ($I_{inf1}$) to be hidden is then established in order to define the exact value of the secondary numerical information $I_{inf2}$ to introduce within the numerical document of reference $I_{ref}$ and used for deriving the modified document $I'_{orig}$. Hence, if there is a correspondence according to the employed criterion for a given pixel (x,y) of the document, the secondary numerical information ($I_{inf2}$) is set equal to the gap image (GAP) for the criterion. Otherwise the primary numerical information to be hidden for that pixel is not taken into account. It should be that this is a substantial advantage of this invention, that the pixels which are dedicated to carry information contribute to render the modified initial document ($I'_{orig}$) as the sum of the initial document ($I_{orig}$) and the secondary numerical information ($I_{inf2}$) close to the initial document ($I_{orig}$).

In the preferred embodiment of this invention, the relationship is established in accordance with the following formula which is used for deriving the value of the secondary numerical information $I_{inf2}(x,y)$ $I_{inf2}(X, Y) = \text{Inf}(GAP(x, y); 0)$ or $\text{Sup}(GAP(x, y), 0)$
according to
whether $I_{inf1}$ is respectively equal to 0 or to 1. This law of correspondence can be also expressed as:

If $(GAP(x,y)<0$ AND $I_{inf1}(x,y)=0)$ OR $(GAP(x,y)>0$ AND $I_{inf1}(x,y)=1)$

THEN $I_{inf2}(x,y) = GAP(x,y)$
ELSE $I_{inf2}(x,y) = 0$

In one implementation of this invention, when the gap image (GAP) corresponds to a value higher than a given threshold, the secondary numerical information ($I_{inf2}$) for a selected pixel (x,y) is set equal to the gap difference )GAP) for the selected pixel (x,y) whatever the value of primary numerical information ($I_{inf1}$) of the selected pixel (x,y) is. At the extraction, a corresponding mechanism is utilized to avoid the values of gap image (GAP') being higher than the considered threshold.

The present invention permits the extraction of the primary numerical information ($I_{inf1}$) from a modified primary numerical document ($I'_{orig}$) which is assumed to contain hidden primary numerical information ($I_{inf1}$) according to the previously described insertion process. The extraction process involves the steps of:

computing a self-similarity code (W') associated to the modified initial document ($I'_{orig}$) by using a same context as that used for the insertion process;

retrieving the secondary numerical information ($I'_{inf2}$) for each pixel from modified initial document ($I'_{orig}$) and the self-similarity code (W') by computing $I'_{inf2} = I_{orig} - A'$, in the particular case where the used code is contractive;

testing the recovered secondary numerical information ($I'_{inf2}$) and deducing the primary numerical information ($I'_{inf1}$) as a function of the binary conventional relationship between a selected pixel of the gap image (GAP(x,y)) and the primary numerical image ($I_{inf1}$) considered during the inserting process.

In the particular case of the previous relationship, this step will result in the fact that the hidden primary numerical information ($I_{inf1}$) is equal to a first digital value (1), if secondary number image ($I'_{inf2}$) is positive; conversely, the hidden primary numerical information ($I_{inf1}$) will be equal to a second digital value (0) for the considered pixel, so that the hidden binary data can be retrieved from the modified document ($I'_{orig}$).

BRIEF DESCRIPTION OF THE DRAWINGS

The invention will be easier to understand after reading the following description associated to the drawings, wherein.

DETAILED DESCRIPTION OF THE INVENTION

Figure 1:
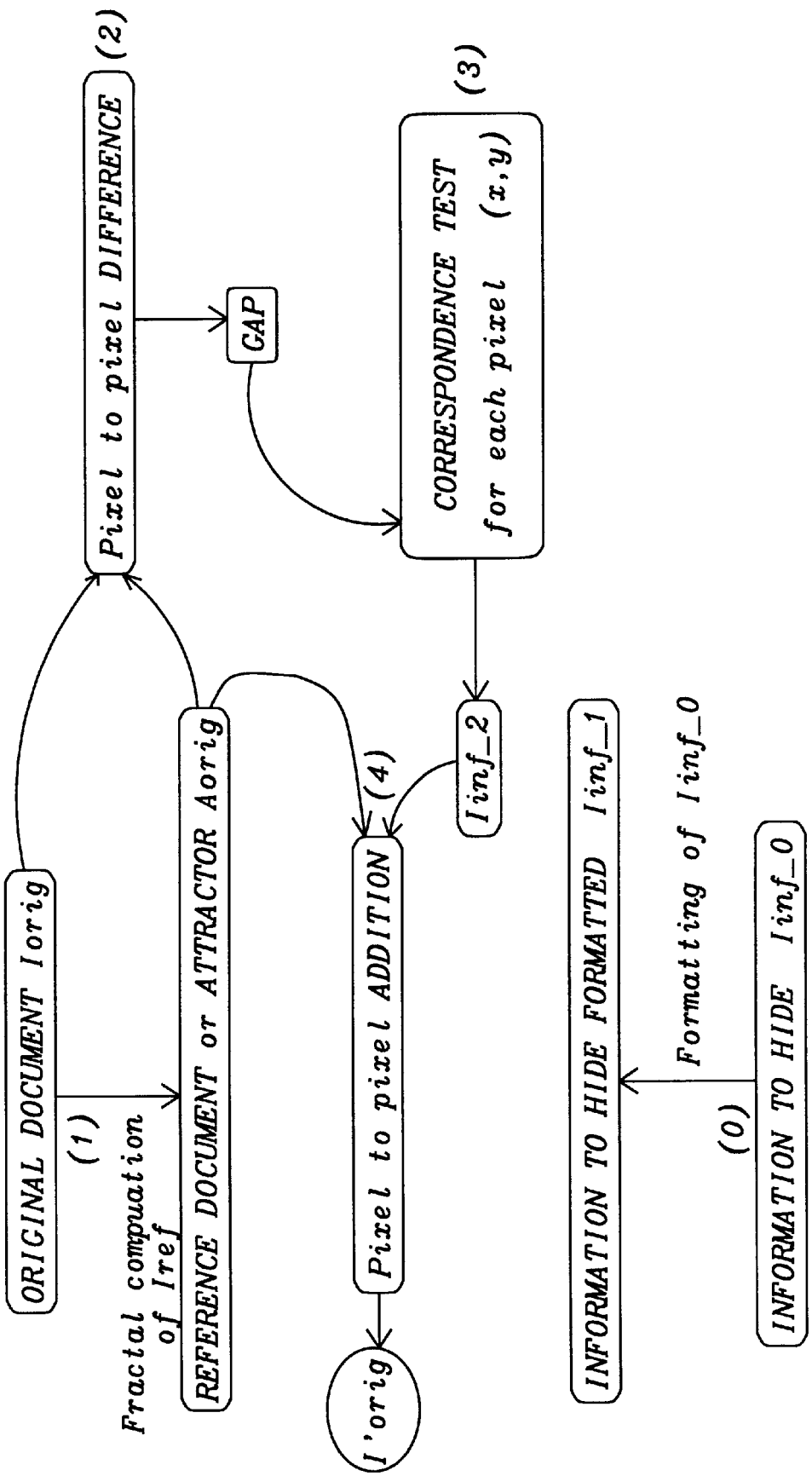
FIG. 1 is a schematic representation of the process of inserting data inside a document.

The invention consists in constructing, from an initial document $I_{orig}$, a numerical reference document $I_{ref}$ via an approximation based on a lossy compression of the image. In the preferred embodiment, a fractal encoding is used, which is based on the concept of self-similarities (originating from the fractal theory) for introducing binary information inside an image, and to avoid the drawbacks of the methods of the background art.

Although the notion of self-similarities is mainly used in the field of image processing for encoding (for example fractal coding), in this case self-similarities can be used for effectively computing an image of reference ($I_{ref}$) for the purpose of inserting a binary numerical information (for instance visual) within a numerical document. For instance, this can be used in gray levels for computing a reference image ($I'_{ref}$) for the purpose of extraction the information previously inserted within the numerical document. If the reference to an "image" is used for clarity, in order to designate a multimedia document. It is clear that the term can also be used for designating any kind of document such as logos, videos, musicals etc.

More precisely, it will be described how to achieve the insertion process, on one hand, and the extraction process of this "additional information", of the other hand.

It will be also described how this information will be preserved even when the image is being subject of a "non destructive" transformation.

The invention is not limited to the processing of images in gray levels. These pictures will be considered as particular examples of use of the invention.

An extension of this approach for hiding newly introduced non-binary information into supporting images will also be discussed.

The self-similarity describes an image, not in terms of "pixels" associated to a gray level but under the form: this area is "similar" to another one model with a given transformation.

In this description, the term "context" refers to the choice of some primitives that are extracted from splitting the image. Context further includes the manner to arrange the primitives, the matching criterion (that is to say, the distance between the reference image $I_{ref}$ and the initial one $I_{orig}$), as well as the pool of authorized transformations between primitives.

The initial image ($I_{orig}$) to be processed is cropped into a set of primitives, called ranges, which must cover the whole image (possibly with overlapping). Moreover, one basic dictionary or code book (Dbase) is built which consists of domain primitives. The elements of this dictionary are also extracted (by default) from the image itself, but they do not need to cover the whole image to process. There is no particular constraint regarding the distribution of the "domain" primitives. The dictionary which is thus built, is then enriched by using geometrical and photometric transformations to form a final dictionary or code book of authorized transformations Dfinal. It should be noted that elements can be added to the Dfinal dictionary that are not available to external users.

Typically affine type transformations will be used to create new primitives, but other more complex transformations can also be utilized.

Transformations can include geometrical operations, such as isometry (i.e. symmetries, rotations, reflections), or photometric transformations, for example on luminance values. The context will make it possible to determine whether the IFS code has contractivity qualities.

In the perspective of a software implementation of the process, the context that is defined is declared with the software responsible for executing calculations relating to the generation and extraction of the mark.

Each range primitive must be matched to a dictionary domain primitive according to a distance criterion. For example, the minimal mean square error (MMSE) which is well-known to the skilled man. Conversely, it could be advantageous, in some situations, to move the reference image $I_{ref}$ away from the original image $I_{orig}$. Usually the Euclidean distance will be used, but other distances could be used.

While indexing the range primitives, the associated transformation will be noted $w_i$ (i.e. the transformation that defines an element of the basic dictionary, plus a transformation). Local transformations ($w_i$) union will be noted W, the image made up of all range primitives and roughly represented from an element of the dictionary of authorized transformations (Dfinal) will be noted transformation (WI), and the attractor associated with W will be noted A, when applicable. If the code selected appears to be contractive, it is possible, thanks to the "collage theorem", to consider attractor A (the image resulting from n reiterations of transformation W) from any initial image $I_0$ or $I_{init}$: $A=W^n(I_{init})$, instead of transformation WI, which is the union of range blocks that are approximated from the original image ($I_{orig}$): WI is the transform of the original image ($I_{orig}$) by W transformation applied once: $W_i=W(I_{orig})$. A transformation W defines its attractor A, since the transformation W applied n times to any image results in image A when the selected IFS code is contractive. When the selected IFS code is not attractive, then reference image ($I_{ref}$) must be derived directly from original image ($I_{orig}$) with formula: $I_{ref}=W(I_{orig})$.

To illustrate an implementation of this invention, a traditionally considered in the image compression technique is used. The primitives are formed of square blocks, thus operating an 8×8 pixels matrix zoning of ranges, and 16×16 pixels matrix zoning for domains. Authorized transformations of the fields are: under-sampling by 2, 0 degree rotation (identity transformation), 90° rotation, 180° rotation and 270° rotation; symmetries regarding geometrical transformations; and a shift and scaling operation of luminance values.

In other terms, each local transformation $w_i$ can be written as:

$$W_i \begin{pmatrix} x \\ y \\ z \end{pmatrix} = \begin{pmatrix} ai & bi & 0 \\ ci & di & 0 \\ 0 & 0 & si \end{pmatrix} \begin{pmatrix} x \\ y \\ z \end{pmatrix} + \begin{pmatrix} ui \\ yi \\ oi \end{pmatrix}$$

where:
- $a_i$, $b_i$, $c_i$, $d_i$ represent the geometrical transformation (over/under-sampling, plus rotation/reflection, . . . );
- (x,y) represent the coordinates of one point of the image and z represents the associated gray shade;
- ($u_i$, $v_I$) represent the displacement which is necessary to match the domain primitive position with the corresponding range primitive;
- $s_i$ and $o_i$ respectively represent scaling and shift of the values of luminance.

In order to ensure the invisibility of the information added to the original image, and to prevent the loss of the quality of the hosting image itself (designated under the reference $I_{orig}$), the invention deviates from the traditional formulation of the problem: i.e. how to add extra information with no visual impact, and considers the problem under a new aspect: i.e. how defining a decomposition which permits the description of an original picture $I_{orig}$ into two components: a first one ($I_{ref}$) computed et mainly linked to the original image $I_{orig}$, denoted; and a second one, denoted $I_{inf2}$, mainly linked to the information to hide, denoted $I_{inf1}$.

We will denote the first image $I_{ref}=WI_{orig}$ (or A in the case of a contractive W, which will be the assumption considered below) and the second component $I_{inf2}$. The aim is to make the sum of images $A+I_{inf2}$ (that is to say the modified image $I'_{orig}$) is as close as possible, according to a visual or audible point of view, of the initial image $I_{orig}$.

More precisely, by the proximity of $I'_{orig}$ from $I_{orig}$, we express the fact that the image $I'_{orig}$ modified by inserting a numerical information will be included, pixel by pixel, inside an interval limited on the one hand by the initial image $I_{orig}$ which is given, and the other hand by the reference image $I_{ref}$, which is computed, the mode of computation is given from the previously defined context.

If it is assumed that the encoding deals with the luminance values of the image (gray scale levels), this one will be, for each pixel, included between (or equal to, or related to) its value in $I_{orig}$ and its value in $I_{ref}$.

DESCRIPTION OF THE INSERTION OF INFORMATION WITHIN AN IMAGE

With respect to FIG. 1, it is shown that the image or the modified document $I'_{orig}$ is obtained, if an IFS based compression is involved, from the addition of the numerical reference document $I_{ref}$ with the secondary numerical information $I_{inf2}$, the latter being derived from a relationship established between the primary digital $I_{inf1}$ to hide, and the difference pixel by pixel (denoted GAP), between the initial document $I_{orig}$, and the digital document of reference ($I_{ref}$).

The use of a fractal transformation coding based on a contractive context will now be described as how the reference document ($I_{ref}$). The reference document or image ($I_{ref}$) can be computed from the initial document ($I_{orig}$).

Further, the digital secondary information ($I_{inf2}$) is calculated from the primary digital information ($I_{inf1}$) which is to be introduced within the original document.

The aim of these calculations is to keep the modified original document ($I'_{orig}$) defined as the sum of the attractor (A) and the secondary numerical information ($I_{inf2}$) ($I'_{orig}$=A+$I_{inf2}$) sufficiently close to the initial document ($I_{orig}$) to avoid too much loss of quality. The modified initial document ($I'_{orig}$) has to appear as close as possible to the initial document $I_{orig}$ but also has to offer enough space for embedding the information that is to be hidden. This tradeoff can be controlled by adjusting the location of reference document ($I_{ref}$) relatively to the initial document ($I_{orig}$).

Determination of $I_{ref}$ (A) From $I_{orig}$

Figure 3:
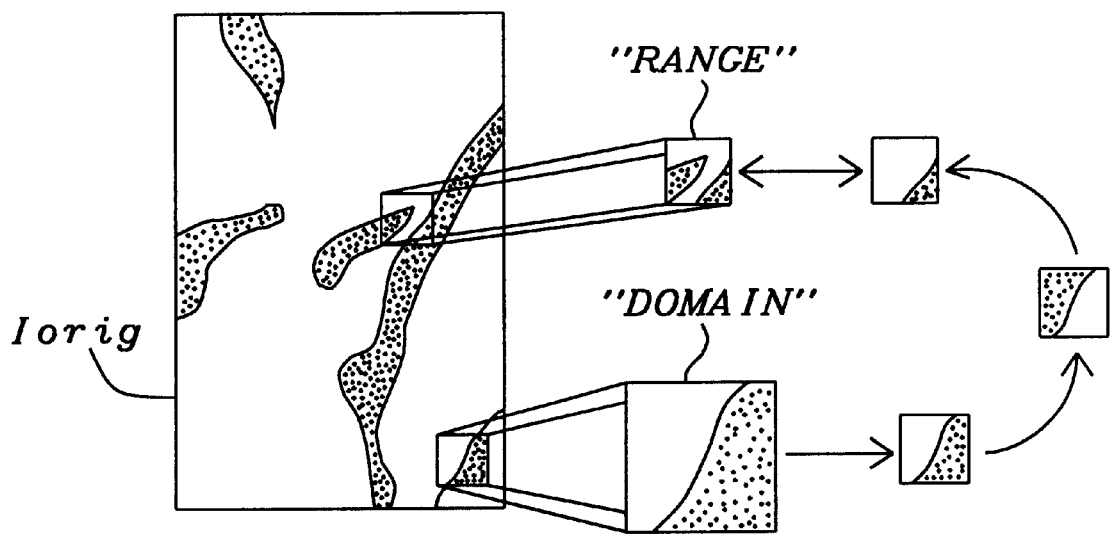
FIG. 3 is a schematic representation of steps of local transformations allowing the matching/mapping between a DOMAIN part of the picture into a RANGE part of the picture.

See FIGS. 1 and 3. In order to compute the digital document of reference ($I_{ref}$) from the original document ($I_{orig}$), the fractal approach is used which consists of splitting the original document into a set of primitives range(i), which cover the totality of the original document. Then, a set of primitives domain(j) is extracted in order to constitute a dictionary of basic primitives domain(j) (Dbase). From the dictionary of basic primitives domain (Dbase), there is determined a dictionary Dfinal of additional domain primitives by applying a set of geometric and/or photometric local transformations $w_i$ to basic primitives. In some embodiments of the invention, it is even possible to introduce secret elements into the Dfinal dictionary in order to enhance the security brought to the insertion process. Thereafter, each basic primitive range(i) could be paired with a Domain(j) primitive included in the primitive dictionary Dfinal, in such a way that each primitive range(i) is equal to a primitive domain(j) transform obtained by a local transformation $w_j$, to within about one error ($\epsilon_i$) allowing to hide a digital information ($I_{inf1}$). The image which is composed of the set of primitives range replaced by an element of the dictionary (Dfinal) is the reference image $I_{ref}$. A description of the image is thus obtained, consisting of an IFS code which is very dependent on the determined context cutting into the primitives that have been selected as well as of the chosen set of affine transformations. As mentioned above, when the context is chosen to correspond to a contractive IFS code, the image $I_{ref}$ to be determined is the attractor A which is the limit resulting from n reiterations of transformation $W^n$ ($I_0$), (or $I_{init}$), where $I_0$ or $I_{init}$ represent any image, for instance black. When the selected IFS code is not attractive, then reference image ($I_{ref}$) must be derived directly from original image $I_{orig}$ with formula: $I_{ref}$=W ($I_{orig}$).

The Choice of the Context

The general context is chosen according to the following criteria:

- the robustness which is desired: the geometrical transformations which are allowed between the blocs domain and range will allow preservation of the information being introduced if those transformations (malevolent or not) are applied on the modified image. The main constraint is to use the same context for the insertion step and for the extraction step.
- the distance between, and the respective position of, $I_{orig}$ and A: the more A will move away from $I_{orig}$, more important will be the space for hiding information at the risk, however, of an increasing visibility of that information.
- the stability of the code (when no spurious manipulation): that is to say to ensure that A' will be close to A, given the fact that the two image $I_{orig}$ and $I'_{orig}$ are similar.

Determination of the Digital Secondary Information $I_{inf2}$ From the Digital Primary Information $I_{inf1}$ to Hide Given the initial binary information ($I_{inf0}$) to be introduced into the original image ($I_{orig}$); the content of the initial binary information ($I_{inf0}$) will mainly depend on the desired use by this insertion/extraction process. If the initial binary information ($I_{inf0}$) and original image ($I_{orig}$) have not the same size, then the original information $I_{inf0}$ has to be formatted into a primary image ($I_{inf1}$) having the same size as the original image ($I_{orig}$). We will then consider that the real information to be introduced within the original image ($I_{orig}$) is a primary image ($I_{inf1}$) which will be considered to be the primary information to hide. The transition from initial binary information ($I_{inf0}$), of any size, to primary numerical information ($I_{inf1}$), correctly formatted, is represented by a step (0) in FIG. 1.

A digital secondary information value ($I_{inf2}$) is derived from a "modulation" of the primary image ($I_{inf1}$) in accordance with a differential gap value (GAP) calculated as the difference between the original image or the initial document ($I_{orig}$) and the reference document ($I_{ref}$). The determination of the digital secondary information value ($I_{inf2}$) complies with the following rule:

At step (1), the differential gap is computed as the difference between the original image ($I_{orig}$) and reference document ($I_{ref}$). This difference is calculated by the formula:

$$GAP = I_{orig} - I_{ref}.$$

If the transform is a contractive IFS code, then:

$$GAP = I_{orig} - A$$

A law of correspondence is chosen between the differential gap (GAP) and the digital primary information to hide the primary image ($I_{inf1}$). As an example, the following law may be considered:

if (GAP(x,y)<0 and $I_{inf1}$(X,Y)=0) Or (GAP(x,y)>0 and $I_{inf1}$(x,y)=1)

then $I_{inf2}$(x,y)=GAP(x,y)

if not $I_{inf2}$(x,y)=0 which is concisely written:

$I_{inf2}$(X, y)=Inf (GAP(x, y); 0) or Sup (GAP(x, y), 0) according to whether a primary image ($I_{inf1}$) is respectively equal to 0 or to 1.

Where:
  operators Inf and Sup respectively represent the mathematical operators returning the smaller and the larger of the values being considered.

This criterion for correspondence between the differential gap (GAP) and the primary image ($I_{inf1}$) permits establishment of a binary link between the differential gap (GAP), which is coded by its sign (positive or negative), and the primary numerical image information ($I_{inf1}$) to be hidden at the particular pixel being considered, which is either 1 or 0. Indeed, it is clear that when $I_{inf1}=0$, only the values of the differential gap (GAP) which are negative will be added to the reference document ($I_{ref}$), and will carry information. Conversely, when reference document ($I_{inf1}$)=1, only positive values of the differential gap (GAP) are added to the reference document ($I_{ref}$) and are consequently carrying information. In all the other cases, the value of digital secondary information value ($I_{inf2}$) will be set to 0, which will result in the return of the approximated value of the reference document ($I_{ref}$) in the building process of. It is noteworthy that the pixels which contain the primary digital information ($I_{inf1}$) will tend to qualitatively move modified image ($I'_{orig}$) away from reference document ($I_{ref}$) and, on the contrary, to bring it closer to original image ($I_{orig}$). Various alternatives can be introduced on the way of modulating the digital secondary information value ($I_{inf2}$) between 0 and the value of the differential gap (GAP), by choosing other terminal values, for example 1 and 1,2 times the value of the differential gap (GAP), instead of 0 and one time the value of the differential gap (GAP).

Given this criterion of correspondence, on an average, only one pixel out of two (at least) from the primary image information ($I_{inf1}$) will be really taken into account. It is possible to ensure that this occurs by inverting, when appropriate, the primary binary image information ($I_{inf1}$) that is to be hidden.

It is useful to moderate this by regarding 1 pixel out of 2. As a matter of fact, an intermediate image ($I_{mig}$) can be considered in which each pixel would be the average value of original image ($I_{orig}$) and reference document ($I_{ref}$). The correspondence criterion is then modified in order to construct the digital secondary information value ($I_{inf2}$) as follows:

$$I_{inf2}(X,Y)=+GAP/2 \text{ if } (GAP(x,y)<0 \text{ and } I_{inf1}(x,y)=0) \text{ or } (GAP(x,y)>0 \text{ and } I_{inf1}(x,y)=1)$$

or, $-GAP/2$ otherwise.
This can also be written as follows:

$$I_{inf2}=-ABS(GAP/2) \text{ or } +ABS(GAP/2)$$

according to the value of $I_{inf1}$ (respectively equal to 0 or to 1), where ABS is the mathematical operator that returns the absolute value.

Hence, each pixel of original image ($I'_{orig}$) will host information from primary image ($I_{inf1}$). Nevertheless, per contra, the insertion effect will be divided by a factor of 2 relatively to the previous law of correspondence. Finally, it is apparent that, as a consequence of this, the law of correspondence used during the extraction step must be modified.

It should be noted that the reconstruction criterion of $I_{inf2}$ can be easily modified in such a way to make the image $I'_{orig}$ be as close as possible to $I_{orig}$. Here, there is a tradeoff between the visibility of the insertion process and the number of pixel of binary information to be hidden. This tradeoff is to be defined as a function of the use of the data hiding process which is desired. For instance, it will be possible to decide to set at the GAP value all pixels that are associated with a difference (GAP) being higher to a given threshold (in absolute value), or to define according to a local good balance criterion that some pixels of the modified image ($I'_{orig}$) be set to the value of original image ($I_{orig}$) (even if the law of correspondence is not satisfied), in order to avoid that some areas concentrate an average amount of pixel close to reference document ($I_{ref}$), which is too high; but in this case, these same pixels can no longer host embedded data.

The visual impact of the inserting process will be function of the difference of the original image ($I_{orig}$) and the modified image ($I'_{orig}$) ($I_{orig}-I'_{orig}$). The level of visibility will be proportional to the difference between the original image and the modified image obtained by the insertion process.

Figure 2:
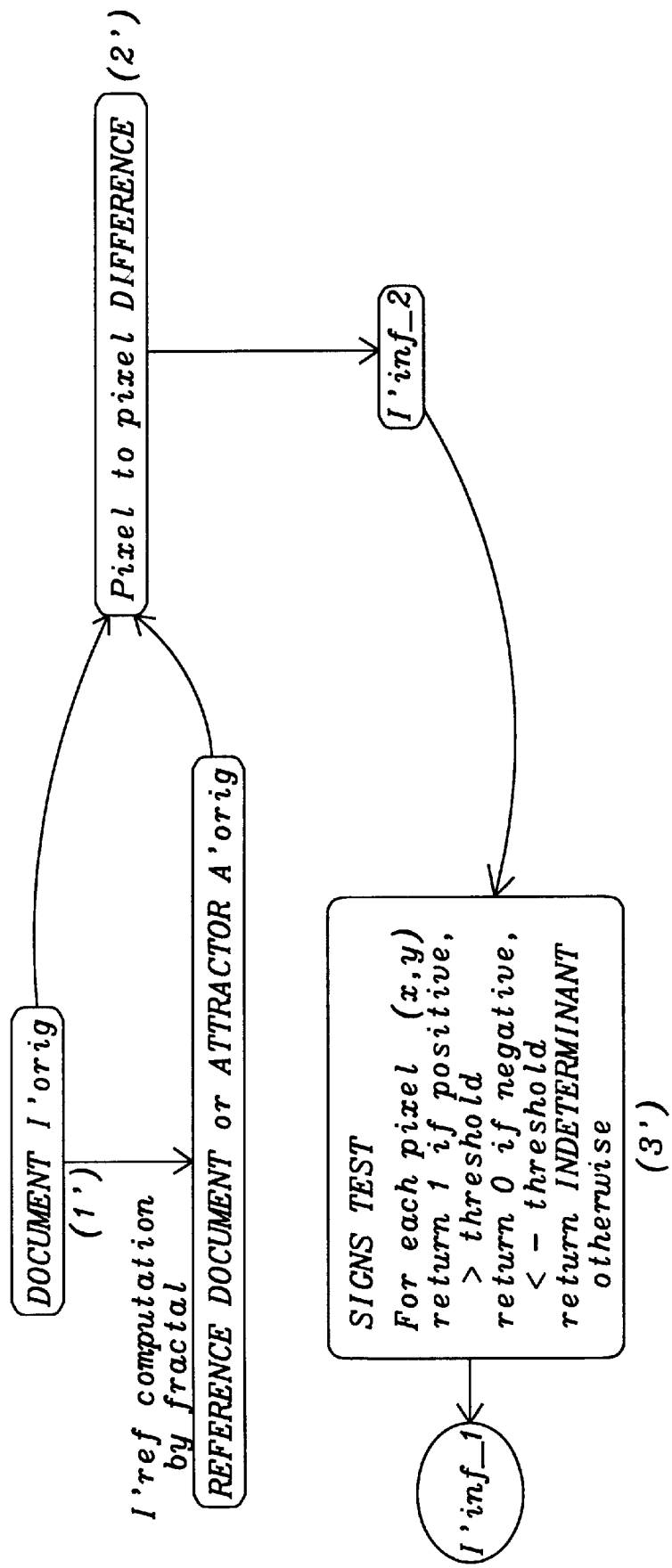
FIG. 2 is a schematic representation of the process of recovering data within the signed image.

The extraction process of hidden information ($I'_{inf2}$) from a modified image ($I'_{orig}$) will now be described, with respect to FIG. 2. Similarly to the insertion process, the extraction involves:

Calculation of the self-similarity code (W') associated with modified image ($I'_{orig}$) by using the same context as that used for the insertion process. This results in a IFS code which allows, as indicated in step (1'), the building of a reference document, noted $I'_{ref}$ in the general case, or A' in the particular case of a fractal calculation of the reference document ($I_{ref}$) with a contractive IFS code;

retrieval of the secondary information value ($I'_{inf2}$), that is to say the differential gap (GAP') from modified image ($I'_{orig}$) and the attractor (A'), with the following formula:

$$I'_{inf2}=I'_{orig}-A'$$

It should be noted that the relationship between attractor (A') and modified image ($I'_{orig}$), is similar to that between attractor (A) and original image ($I_{orig}$). Thus, the reference image from the attractor (A)' is being reconstructed from the modified image ($I'_{orig}$). First, the code being associated to the original image ($I_{orig}$) and the attractor (A) are identical (the first one by construction and the second by definition of an attractor) and, second, that each point-image of the modified image ($I'_{orig}$) is included in the interval defined by its value in original image ($I_{orig}$) and the attractor (A).

Determination of the Primary Numerical Information $I'_{inf1}$ From the Secondary Information $I'_{inf2}$ The primary image ($I'_{inf1}$) can be determined from the secondary digital information ($I'_{inf2}$) by means of a test corresponding to the insertion operation.

The primary image ($I'_{inf1}$) is determined as follows:

if $I'_{inf2}(x,y)$>THRESHOLD, then $I'_{inf1}(x,y)=1$ if $I'_{inf2}(x,y)$<−THRESHOLD then $I'_{inf1}(x,y)=0$ if $I'_{inf2}(x,y)$<THRESHOLD or $I'_{inf2}(x,y)$>−THRESHOLD then pixel (x,y) does not contain any hidden information).

where:
  THRESHOLD is a predetermined threshold value.
  By default, the predetermined threshold is fixed at 0, but as indicated for the information extraction stage described above, other larger thresholds could be used in order to limit the probability of mistakes to each point or pixel (x,y), but in this case the amount of binary data retrieved from whole hidden information is similarly decreased. The threshold is regulated to the position of the exact modulation retained during the insertion part. This threshold can be easily regulated by one skilled in the art.

The process of insertion and extraction has been particularly described with the fractal transformation method of analysis. With or without using a contractive code, This method provides very fair results. It is nevertheless useful to observe that, in the particular field of digital imaging, the process of this invention can be used with some other techniques of approximation. For example a lossy source coding such as JPEG or GIF, as well as a basic technique of resolution reduction.

A direct application of the present invention is described for an insertion process in the case of a JPEG compression. In this case, the initial document and the digital document of reference are respectively an initial image ($I_{orig}$) and an image of reference ($I_{ref}$).

Like the process as described above employing fractal transformation analysis, the process of insertion consists of a first computation of the reference image ($I_{ref}$) from an initial image ($I_{orig}$), which is a visual image. The principle of JPEG encoding is well known to one skilled in the art, and will not be elaborated further on. The essential characteristic of this invention is the approximated image that results in the reference image ($I_{ref}$) is an image which has undergone some loss of information compared to the original image ($I_{orig}$). This kind of loss of information allows inserting of data of secondary information ($I_{inf2}$) into the original image ($I_{orig}$). As soon as the reference document ($I_{ref}$) is determined, one can compute by subtracting a differential gap (GAP) for each pixel (x,y), as in the case of fractal analysis. This differential gap (GAP) for each pixel (x,y) is then "modulated" with the primary numerical/digital information ($I_{inf1}$) for each pixel (x,y) to be inserted in the original image ($I_{orig}$) to constitute modified image ($I'_{orig}$).

For doing that, we use a criterion or a correspondence law between the differential gap (GAP) for each pixel (x,y) and the primary image ($I_{inf1}$) for each pixel (x,y) allowing the value of secondary information value ($I_{inf2}$) for the pixel (x,y) to be derived.

In a preferred embodiment, it can be shown that the secondary information value ($I_{inf2}$) for the pixel (x,y) can be determined by the formula:

$$I_{inf2}(x,y) = inf(GAP, THRESHOLD) \text{ or } sup(GAP, THRESHOLD),$$

according to the value of primary information ($I_{inf1}$) for each pixel (x,y) is equal to 0 or 1.

It appears that the value of the parameter THRESHOLD can be used for the purpose of adjustment, and for control of the distribution of the pixels carrying information. In a preferred mode, the value of the THRESHOLD parameter is set to the numerical value 0, so that a simple correspondence between primary information ($I_{inf1}$) of the pixel (x,y) and the sign of the differential gap value (GAP) of the pixel (x,y) is established, allowing a uniform distribution of the host pixels among the values "0" and "1" and the pixels (x,y) of the primary image ($I_{inf1}$).

In another embodiment, the secondary information value ($I_{inf2}$) for the pixel (x,y) can be determined by the formula:

$$I_{inf2}(x,y) = -ABS(GAP/2) \text{ or } +ABS(GAP/2)$$

according to the fact that $I_{inf1}$ is respectively equal to 0 or 1, where ABS is the mathematical operator that returns the absolute value.

The insertion process is achieved by the pixel by pixel addition, of the value of the digital secondary information $I_{inf2}$ for a selected (x,y) to the reference image $I_{ref}$ derived from the JPEG compression. Therefore, the modified document image ($I'_{orig}$) can be obtained, i.e. image which is very close to the original image ($I_{orig}$). The invention specifically presents the particularity that the pixels that carry information—because of their relevance during the extraction process—are the pixels which allow movement closer to the image ($I_{orig}$), and movement away from the image ($I_{ref}$), contrary to the traditional approach where the insertion of data introduces distortion to the quality of the image. In effect, the classical approach results in significantly degrading the modified image ($I'_{orig}$) from the initial image ($I_{orig}$) with the addition of the primary numerical information ($I_{inf1}$). Firstly, the choice of lossy compression, already provides a degraded reference image ($I_{ref}$) and, secondly, the supplementary addition of digital information according to a classical approach would result in moving the constructed image ($I'_{orig}$) further away from the original image ($I_{orig}$).

On the contrary, with the present invention, it is an advantage to choose a context resulting in a definite distance between reference image ($I_{ref}$) and the original image ($I_{orig}$). In fact, this distance is not detrimental to the reference image ($I_{ref}$). Since, in a second step, the reference image ($I_{ref}$) is added, pixel by pixel, to the secondary information value ($I_{inf2}(x,y)$). For approximately one half of the image pixels this operation is equal to a differential gap information (GAP) which allows placement of the reference image ($I_{ref}$) nearer to the original image ($I_{orig}$). Hence, on the contrary of classical approaches which has a tendency to significantly decrease the quality of the initial image ($I_{orig}$), the invention successively withdraws, then brings together the modified original image ($I'_{orig}$) in order to finally obtain an image modified original image ($I'_{orig}$) that is close enough to the original image ($I_{orig}$), with the capacity for hiding a large amount of data.

In order to permit the blind extraction of the numerical information $I'_{inf1}$ from inside the modified original image ($I'_{orig}$) that may have undergone several transformations, the process, applied to JPEG compression, includes the following steps:

First, a reference image ($I'_{ref}$) is derived from the image modified original image ($I'_{orig}$) in accordance with the same lossy compression process, such as JPEG, which was used during the insertion part.

From the reference image ($I'_{ref}$), the secondary information value ($I_{inf2}$) is determined as the differential gap (Gap). The differential gap (GAP being the difference of the modified original image ($I'_{orig}$) and the derived reference image ($I'_{ref}$) as determined by the formula:

$$I'_{inf2} = GAP'(x,y) = I'_{orig}(x,y) - I'_{ref}(x,y)$$

Thus determined secondary information value ($I'_{inf2}$) is equal to the differential gap (GAP'(x,y)) is generally equal, or very close to secondary information value ($I_{inf2}$) that was inserted during the insertion process.

The value of the differential gap (GAP') for each pixel (x,y) using the correspondence law between differential gap (GAP) and the primary information ($I_{inf1}$) that had been previously used during the insertion process. This analysis leads to the value of the derived primary ($I'_{inf1}$) for each pixel (x,y).

More precisely, if the law of correspondence used during the insertion stage was:

If $I_{inf1}(x,y)=0$, then $I_{inf2}(x,y)=Inf(GAP(x,y);0)$ and

If $I_{inf1}(x,y)=1$, then $I_{inf2}(x,y)=Sup(GAP(x,y);0)$

Then, it will be sufficient in the extraction process to search the sign of the value derived differential gap (GAP') for each pixel (x,y) in order to directly obtain the value of derived primary information ($I'_{inf1}$). If the law of correspondence is based on a threshold that is different from zero, then it is sufficient to compare the value of derived differential gap (GAP') for each pixel (x,y) to this threshold in order to directly determine the adequate value of derived primary information ($I'_{inf1}$) for each pixel (x,y).

In general, the stability and accuracy of the extraction process will allow to immediate identification of the primary digital information ($I'_{inf1}$) obtained at the extraction process, with the primary digital information ($I_{inf1}$) which has been introduced during the insertion step, even if the image has undergone some modifications. The process as described allows attempts the full blind extraction of digital information. The process of this invention is also usable in case a non blind extraction. Obviously, one skilled in the art will be able to apply the principles of this invention to other kinds of coding in addition to the fractal coding and the JPEG compression as presented. One can set up the insertion and blind extraction of an image using the method of this method based on a technique of image resolution reduction.

While the invention has been described with images of the primary information ($I_{inf}$)$_1$, secondary information ($I_{inf2}$) and the differential gap (GAP) involving only two components (x,y), it is clear that the use of two components is not a limitation at all, and that one skilled in the art will easily apply the invention to a variety of multi-parameter applications.

Advantages of the Present Invention

The present invention resolves the considered problem, and provides several advantages relative to known/existing processes as described hereinafter.

Accuracy of Recovery Even After Benevolent or Malevolent Image Manipulations Considering now that the image from which we would like to retrieve the embedded information is no longer the modified original image ($I'_{orig}$) but a second modification of the original image ($I''_{orig}$), after manipulations of the modified original image ($I'_{orig}$) have been executed.

Thanks to the use of "self-similarities" inside pictures and the fractal transformation analysis for computing of reference image ($I_{ref}$) and the derived reference image ($I'_{ref}$), the recovered information is "reliable"/still valid even if some previously authorized geometric and/or photometric additions have occurred during the search of similarities between "range" and "domain" primitives (i.e. included in the "context"). In other words, it will be possible to hide or embed information inside a picture, then to perform some authorized modification that is included in the codebook or dictionary (Dfinal) the modified original image ($I'_{orig}$), and still be able to retrieve the hidden primary information ($I_{inf1}$) from the transformed image ($I''_{orig}$). It is important to consider that in order to increase the accuracy of the process, it is only necessary more importantly to define a number of authorized information transformations in the context. Some examples of classical image transformations are indicated below.

Photometric Transformations

If the image $I'_{orig}$ is modified toward an image $I''_{orig}$, in such a way that for each "domain" primitive one has the second modification of the original image ($I''_{orig}$) defined as the formula:

$$I''_{orig} = \alpha I'_{orig} + \beta$$

then $I''_{inf2} = I'_{inf2}$ where:
$I''_{inf2}$ is the retrieved secondary information from the second modification of the original image ($I''_{orig}$).

This means that the insertion process of the primary information ($I_{inf1}$) is recoverable from to affine geometric transformations that occur in photometric transformation.

Geometric Transformations

If one uses the context previously described, in case of rotation of 0°, 90°, 180°, 270° degrees, retrieved secondary information ($I''_{inf2}$) will follow the same modification R as the modified original image ($I'_{orig}$) itself (i.e.: $I''_{inf2} = R(I'_{inf2})$).

In case of change of scale H modified original image ($I'_{orig}$) to create a second modification of the original image ($I''_{orig}$), the retrieved secondary information is now determined by the formula:

$$I''_{inf2} = H(I'_{inf2}).$$

In case of shift (i.e.: translation) of image areas, where image areas are possibly removed. The removal of the image areas implies the removing of the corresponding parts inside $I'_{inf2}$, but the rest of the hiding data will be globally saved.

More generally, it is sufficient that:

$$\text{sign}\{Tf(I'_{inf2}(x,y))\} = \text{sign}(I'_{inf2}(x,y)))$$

in order to ensure that $I''_{inf1} = I'_{inf1}$ where, sign(X)=0 if X=0; +1 if X>0 and −1 if X<0; and the modification Tf is chosen such that:

$$I''_{orig} = Tf\{I'_{orig}\}$$

The sign that was added during its transformation rather than the exact value of the differential gap (GAP) provides most of the accuracy, since the transformed buried primary image ($I_{inf1}$) has most of the information needed for the extraction.

Extensions of the Invention

The invention described above in general terms can be easily extended and applied to some specific situations, as shown in the following example.

The principle of this invention can be adapted to color images. According to the considered system of colors, it will eventually be necessary to apply a change of color space in order to go in a Luminance/Chrominance space of representation (or also under the form: luminance, hue, saturation). The inverse operation exists; in the case of RGB images (Red Green Blue), it will be necessary to operate a transformation into Luminance/Chrominance components, then to realize the insertion operation, and finally to operate the inverse operation in order to come back inside RGB components.

As soon as the luminance component is isolated, the insertion and extraction operations can be performed exactly as described previously in the case of images in gray levels.

One can note, that the additional information, will still be present after a conversion of a color modified original image ($I'_{orig}$) to an a second modification of the original image ($I''_{orig}$) in gray levels.

Moreover, the principle of the invention can be adapted to videos. Two possibilities exist: either to operate image by image by inserting the additional information as previously described in the case of still images. This approach must be spread out when using IFS code estimation by using a spatio-temporal primitive instead of a spatial primitive (typically, cubes instead of squared blocks). It can be noted that a video includes a higher capacity (more potential host sites) and therefore it can hide more information. It can also hide it in a more robust way by increasing the redundancy. Fore example, one can envisage the insertion of the binary law of correspondence image by image.

The principle of the invention can be adapted to insert some information other than binary.

It is also possible to envision inserting information more complex than binary information using the technique of bit planes. The information in gray levels could be decomposed by using the classical way as a weighted sum (by power of 2) of binary images. In the case of information $I_{inf0}$ of size k×k, the binary information to hide it will then be of size 8k×8k. If the reserved space for the information to hide it is sufficient/enough, then this principle can also be extended to information in colors.

Finally, the present invention could be adapted to hide some audio signals inside a document, and vice versa.

Industrial Applications of the Invention

A wide range of applications can already be envisioned: the copyright (owner authentication), content authentication, content (integrity of a document), the tracking and correction of errors, and checkpoints inside a network. According to the targeted use, the proposed process can be used to modulate the definition of a correct context; to define the nature of information to hide (i.e.: the watermark design), as well as the insertion and extraction operator parameters. Some examples of applications are given.

Copyright. The aim is, for an owner or a company to protect a document such as an image. This could be done by inserting as information a binary logo of the company as information or even a picture of the owner's face.

Integrity. The aim here is to be able to identify whether or not an image has been significantly modified. For that, the information to be hidden will depend of the image features itself: histogram of gray levels (under the form of a binary image), edges map (in superposition of the image), or a specific motif. One nevertheless notes the following difficulty; the image features will be modified because hiding data inside a picture will modify its features.

Non repudiation. The aim is to have a trace of the owner automatically inserted when he/she sends an image to another person, i.e. a logo associated to him/her (fingerprinting, digital signature, . . . . ) and/or the workstation from which he/she sends the image (fax, PC, Mobile, . . . ).

Tracking. The use of the present invention could be extended to include a way that one could know, thanks to a trace, if that or that picture has been previously photocopied and printed.

Network Checkpoints. The present invention could be used to avoid transmission of forbidden pictures over networks (such as Internet) by taking advantage of basic transformations performed prior to the automatic checkpoints implemented prior to transmission over the network. and The inverse transformations being performed just after receipt of the pictures from the network.

Some other uses such as correcting errors could be envisioned. The basic idea would consist of inserting pictures or important information inside the areas of the pictures considered as unimportant. In case of a limited or important lost to relevant areas, a partial recovering of them would then be possible by extracting the information embedded inside the areas originally considered to be less important.

The invention claimed is:

1. A process for hiding primary numerical information ($I_{inf1}$) inside an initial numerical document ($I_{orig}$), comprising the steps of:

generating a numerical document of reference ($I_{ref}$) as a function of said initial numerical document ($I_{orig}$);

generating a gap image, said gap image being the difference between said initial numerical document ($I_{orig}$) and said numerical document of reference ($I_{ref}$);

generating a secondary numerical information ($I_{inf2}$) as a function of said gap image and said primary numerical information ($I_{ref}$) for hiding said primary numerical information ($I_{inf1}$); and adding said secondary numerical information ($I_{inf2}$) to said numerical document of reference ($I_{ref}$) in order to obtain a modified initial numerical document ($I'_{orig}$) close to the initial numerical document ($I_{orig}$), said modified initial document having no visual distortion from hiding the primary numerical information ($I_{inf1}$).

2. The process according to claim 1 wherein obtaining a value of each pixel of the modified initial document ($I'_{orig}$) is formed from the value computed in the numerical document of reference ($I_{ref}$) and the value given by the initial document ($I_{orig}$).

3. The process according to claim 2 wherein computing the numerical document of reference ($I_{ref}$) from the initial document ($I_{orig}$) comprises the step of executing a fractal transformation method, wherein said fractal transformation method comprises the steps of:

splitting the initial numerical document ($I_{orig}$) into a set of range primitives covering the whole initial document;

extracting from the initial numerical document ($I_{orig}$) a set of domain primitives, in order to create a basic codebook of domain primitives;

determining from the basic codebook of basic domain primitives a final codebook of additional domain primitives, by applying to the basic primitives, a set of local geometric and/or photometric transformations; and matching each basic range primitive with one domain primitive of the basic codebook, in such a way that each range primitive is equal to a transformed domain primitive via an elementary transformation, plus an error factor, which allows the primary numerical information ($I_{inf1}$) to be embedded, the image being composed by the set of range primitives computed from a domain primitive itself extracted from the final codebook (Dfinal) being said numeric document of reference ($I_{ref}$).

4. The process according to claim 3 wherein a program code which is associated with the fractal analysis is of a contractive type for determining said secondary numerical information ($I_{inf2}$) from said primary numerical information ($I_{inf1}$), wherein said program code executes a program process comprising the steps of:

calculating a the gap difference as a difference between the initial numerical document ($I_{orig}$) and an attractor (A), said attractor (A) being defined by a fractal code (W) associated to the initial numerical document ($I_{orig}$),, and computing for each point (x, y) of the initial numerical document ($I_{orig}$), the said secondary numerical information ($I_{inf2}$) from said gap difference and said primary numerical information ($I_{inf1}$);

establishing a binary link criterion between gap difference and said primary numerical information ($I_{inf1}$);

setting secondary numerical information ($I_{inf2}$) equal to said gap difference in response to a correspondence to said binary link criterion for each pixel; and disregarding primary numerical information ($I_{inf1}$) for each pixel if there is not correspondence to said binary link criterion.

5. The process according to claim 4 wherein the binary link criterion is determined by the formula:

If (GAP(x,y)<0 AND $I_{inf1}$(x,y)=0) OR (GAP(x,y)>0 AND $I_{inf1}$(x, y)=1)

THEN $I_{inf2}$(x,y)=GAP(x,y)
ELSE $I_{inf2}$(x,y)=0
where:
GAP(x,y) is the gap difference for a pixel having coordinates x, y,
$I_{inf1}$ is the primary numerical information,
$I_{inf2}$ is the secondary numerical information.

6. The process of claim 1 wherein the initial numerical document ($I_{orig}$) is a multimedia document containing image data, textual data or image data of a logo of a company in gray levels.

7. A process for extracting a primary numerical information $I_{inf1}$ from a modified initial numerical document ($I'_{orig}$) which is assumed to host a hidden primary numerical information $I_{inf1}$, said process comprising the steps of:

computing a self-similarity code W' associated to the modified initial numerical document ($I'_{orig}$) by using a context utilized for computing said modified initial numerical document ($I'_{orig}$);

retrieving a secondary numerical information ($I'_{inf2}$) for each pixel from said modified initial numerical document ($I'_{orig}$) and a self-similarity code (W'), said retrieving comprising the step of:
computing secondary numerical information ($I'_{inf2}$) as a difference between modified initial numerical document ($I'_{orig}$) and an attactor (A'), said attractor (A') being defined by the self-similarity code (W') associated to the modified initial numerical document ($I'_{orig}$);

determining if said self-similarity code (W') is contractive; and if said self-similarity code (W') is contractive, testing the secondary numerical information $I'_{inf2}$ and deducing $I'_{inf1}$ as a function of a binary relationship between a gap difference and the primary numerical information ($I_{inf1}$).

8. The process according to claim 7, wherein the testing of said secondary numerical information ($I'_{inf2}$) comprises the step of:

computing from the retrieved secondary numerical information ($I'_{inf2}$), the primary numerical information $I'_{inf1}$ by the steps of:
if the retrieved secondary numerical information $I'_{inf2(x,y)}$ is greater than a predetermined threshold value (S), setting the secondary numerical information ($I'_{inf2(x,y)}$) to a first digital value;
if the retrieved secondary numerical information ($I'_{inf2(x,y)}$) is less than a negative value of said threshold value (−S), setting the retrieved secondary numerical information ($I'_{inf2(x,y)}$) to a second digital value; and
if the retrieved secondary numerical information $I'_{inf2(x,y)}$ is not greater than a predetermined threshold value (S) and less than the negative value of said threshold value (−S) setting the retrieved secondary numerical information ($I'_{inf2(x,y)}$) corresponding to one pixel (x, y) does not carry any hidden information.

9. The process of claim 7 wherein testing the secondary numerical information ($I'_{inf2}$) comprises the steps of;

determining that the hidden primary numerical information ($I_{inf1}$) is equal to 1 if the secondary numerical information ($I'_{inf2}$) is positive; and determining that the hidden primary numerical information ($I_{inf1}$) is equal to 0 if the secondary numerical information ($I'_{inf2}$) is negative.

10. A process for hiding a primary numerical information ($I_{inf1}$) inside an original document ($I_{orig}$) comprising the steps of:

determining a reference document $I_{ref}$ by means of a lossy approximation transformation method upon said original document ($I_{orig}$);

determining a gap image being equal to a difference between said original document ($I_{orig}$) and said reference document ($I_{ref}$);

determining a secondary numerical information ($I_{inf2}$) computed as a function of said gap image in accordance with a correspondence rule between said gap image and said primary numerical information ($I_{inf1}$); and adding said secondary numerical information ($I_{inf2}$) to said reference document ($I_{ref}$) in order to produce a modified document ($I'_{orig}$) substantially dose to said original document ($I_{orig}$).

11. The process according to claim 10 wherein determining said secondary numerical information ($I_{inf2}$) comprising the step of computing said secondary numerical information ($I_{inf2(x,y)}$) by the steps of:

$I_{inf2}$=inf(GAP,THRESHOLD) or sup(GAP, THRESHOLD), where:
inf is a function that yields the lesser of the operators,
sup is function that yields the greater of the operators,
GAP is a gap image value, and
THRESHOLD is a predetermined threshold value.

12. The process according to claim 11 comprising the steps of setting the threshold value to null level so that the value secondary numerical information ($I_{inf2(x,y)}$) is selectively equal to the gap image value (GAP) or the null level dependant on whether the pixel is carrying an information or not, thereby substantially moving the modified document ($I'_{orig}$) close to the original document ($I_{orig}$).

13. The process according to claim 10 wherein determining said secondary numerical information ($I_{inf2}$) comprises the step of solving the formula:

$I_{inf2}$=−ABS(GAP/2) or +ABS(GAP/2) whereby the primary numerical information ($I_{inf1}$)is respectively equal to 0 or 1.

14. The process of claim 10 wherein said process is applied to digitized images and that said lossy transformation method includes a set of coding transformation methods, said set of coding transformation methods selected from the set of coding transformation methods consisting of a JPEG coding, a resolution reduction coding, or a fractal analysis coding.

15. A process for extracting a primary numerical information ($I_{inf1}$) inside a modified document ($I'_{orig}$) comprising the steps of:
   determining a reference document $I'_{ref}$ by means of a lossy approximation transformation method on said modified document ($I'_{orig}$);
   determining a gap image between said modified document ($I'_{orig}$) and said reference document ($I'_{ref}$); and
   deducing the value of said primary numerical information ($I_{inf1}$) from a comparison between said gap image and a threshold value.

16. The process of claim 15 wherein the threshold value is zero and testing the secondary numerical information ($I'_{inf2}$) comprises the steps of;
   determining that the hidden primary numerical information ($I_{inf1}$) is equal to 1 if the comparison between said gap image and the threshold value is positive; and
   determining that the hidden primary numerical information ($I_{inf1}$) is equal to 0 if the comparison between said gap image and a threshold value is negative.

17. The process of claim 15 wherein said process is applied to the field of digitized imaging and that said lossy transformation method includes a set of coding transformation methods, said set of coding transformation methods selected from the set of coding transformation methods consisting of a JPEG coding, a resolution reduction coding or a fractal analysis coding.

18. A system that hides primary numerical information ($I_{inf1}$) inside an initial numerical document ($I_{orig}$), comprising:
   a numerical document of reference ($I_{ref}$) generator connected to receive said initial numerical document ($I_{orig}$) and for creating a numerical document of reference ($I_{ref}$) as a function of the initial numerical document ($I_{orig}$);
   a gap image generator connected to receive said initial numerical document ($I_{orig}$) and in communication with the a numerical document of reference ($I_{ref}$) generator to receive said a numerical document of reference ($I_{ref}$) to generate a gap image as the difference between said initial numerical document ($I_{orig}$) and said numerical document of reference ($I_{ref}$);
   a secondary numerical information ($I_{inf2}$) generator connected to receive the primary numerical information ($I_{inf1}$), in communication with the a numerical document of reference ($I_{ref}$) generator to receive the a numerical document of reference ($I_{ref}$), and in communication with the gap image generator to receive the gap image to determine a secondary numerical information ($I_{inf2}$) as a function of said gap image and said primary numerical information ($I_{ref}$) to hide said primary numerical information ($I_{inf1}$); and
   a modified initial numerical document ($I'_{orig}$) generator in communication with the a numerical document of reference ($I_{ref}$) generator to receive the a numerical document of reference ($I_{ref}$), in communication with the secondary numerical information ($I_{inf2}$) generator to receive secondary numerical information ($I_{inf2}$), said modified initial numerical document ($I'_{orig}$) generator creating a modified initial numerical document ($I'_{orig}$) by adding said secondary numerical information ($I_{inf2}$) to said numerical document of reference ($I_{ref}$), said a modified initial numerical document ($I'_{orig}$) closely approximating the initial numerical document ($I_{orig}$) without any visual distortion from hiding the primary numerical information ($I_{inf1}$).

19. The system of claim 18 wherein obtaining a value of each pixel of the modified initial document ($I'_{orig}$) is formed from a value computed by the numerical document of reference ($I_{ref}$) generator and a value from the initial document ($I_{orig}$).

20. The system of claim 18 wherein the numerical document of reference ($I_{ref}$) generator creates the numerical document of reference ($I_{ref}$) from the initial document ($I_{orig}$) by executing a fractal transformation method, wherein said fractal transformation method comprises the steps of:
   splitting the initial numerical document ($I_{orig}$) into a set of range primitives covering the whole initial document;
   extracting from the initial numerical document ($I_{orig}$) a set of domain primitives, in order to create a basic codebook of domain primitives;
   determining from the basic codebook of basic domain primitives a final codebook of additional domain primitives, by applying to the basic primitives, a set of local geometric and/or photometric transformations;
   matching each basic range primitive with one domain primitive of the basic codebook, in such a way that each range primitive is equal to a transformed domain primitive via an elementary transformation, plus an error factor, which allows the primary numerical information ($I_{inf1}$) to be embedded, the image being composed by the set of range primitives computed from a domain primitive itself extracted from the final codebook (Dfinal) being said numeric document of reference ($I_{ref}$).

21. The system of claim 20 wherein the numerical document of reference ($I_{ref}$) generator executes a program code that performs the fractal analysis is of a contractive type for determining said secondary numerical information ($I_{inf2}$) from said primary numerical information ($I_{inf1}$), wherein said program code performs a program process comprising the steps of:
   calculating a the gap difference as a difference between the initial numerical document ($I_{orig}$) and an attractor (A), said attractor (A) being defined by a fractal code (W) associated to the initial numerical document ($I_{orig}$), and
   computing for each point (x, y) of the initial numerical document ($I_{orig}$), the said secondary numerical information ($I_{inf2}$) from said gap difference and said primary numerical information ($I_{inf1}$);
   establishing a binary link criterion between gap difference and said primary numerical information ($I_{inf1}$);
   setting secondary numerical information ($I_{inf2}$) equal to said gap difference in response to a correspondence to said binary link criterion for each pixel and,
   disregarding primary numerical information ($I_{inf1}$) for each pixel if there is not correspondence to said binary link criterion.

22. The system according to claim 21 wherein the binary link criterion is determined by the formula:

If (GAP(x,y)<0 AND $I_{inf1}$(x,y)=0) OR (GAP(x,y)>0 AND $I_{inf1}$(x, y)=1)

THEN $I_{inf2}$(x,y)=GAP(x,y)
ELSE $I_{inf2}$(x,y)=0
where:
   GAP(x,y) is the gap difference for a pixel having coordinates x, y,
   $I_{inf1}$(x,y) is the primary numerical information for the pixel having coordinates x, y, $I_{inf2}$ (x,y) is the secondary numerical information for the pixel having coordinates x, y.

23. The system of claim 18 wherein the initial numerical document ($I_{orig}$) is a multimedia document containing image data, textual data or image data of a logo of a company in gray levels.

24. A system for extracting a primary numerical information $I_{inf1}$ from a modified initial numerical document ($I'_{orig}$) which is assumed to contain a hidden primary numerical information $I_{inf1}$, said system comprising:

a calculating device connected to receive the modified initial numerical document ($I'_{orig}$) and from said modified initial numerical document ($I'_{orig}$) computing a self-similarity code (W') associated to the modified initial numerical document ($I'_{orig}$) using a context utilized in originally computing said modified initial numerical document ($I'_{orig}$) and said calculating device determining if said self-similarity code (W') is contractive;

a secondary numerical information ($I'_{inf2}$) extraction device connected to receive the modified initial numerical document ($I'_{orig}$) and in communication with the calculating device for receiving the self-similarity code (W') and from said modified initial numerical document ($I'_{orig}$) and the self-similarity code (W'), said a secondary numerical information ($I'_{inf2}$) extraction device computing secondary numerical information ($I'_{inf2}$) as a difference between modified initial numerical document ($I'_{orig}$) and an attactor (A'), said attractor (A') being defined by the self-similarity code (W') associated to the modified initial numerical document ($I'_{orig}$); and a testing device in communication with the calculating device to receive an indication if said self-similarity code (W') is contractive and in communication with the a secondary numerical information ($I'_{inf2}$) extraction device, if said self-similarity code (W') is contractive, said testing device tests the secondary a gap image device connected to receive the original document ($I_{orig}$) and in communication with the reference document ($I_{ref}$) generator to receive the reference document ($I_{ref}$) for determining a gap image as a difference between said original document ($I_{orig}$) and said reference document ($I_{ref}$);

a secondary numerical information ($I_{inf2}$) generator connected to receive said primary numerical information ($I_{inf1}$) and in communication with the gap image device, said secondary numerical information ($I_{inf2}$) generator determining a secondary numerical information ($I_{inf2}$) as a function of said gap image in accordance with a correspondence rule between said gap image and said primary numerical information ($I_{inf1}$); and a combining device in communication with the reference document ($I_{ref}$) generator to receive the reference document ($I_{ref}$) and in communication with the secondary numerical information ($I_{inf2}$) generator to receive the secondary numerical information ($I_{inf2}$), said combining device adding said secondary numerical information ($I_{inf2}$) to said reference document ($I_{ref}$) in order to produce a modified document ($I'_{orig}$) substantially close to said original document ($I_{orig}$).

25. The system according to claim 24 wherein the testing device determines from said secondary numerical information ($I'_{inf2}$) the primary numerical information $I'_{inf1}$ by the steps of:

if the retrieved secondary numerical information $I'_{inf2\ (x,y)}$ is greater than a predetermined threshold value (S), setting the secondary numerical information ($I'_{inf2(x,y)}$) to a first digital value;

if the retrieved secondary numerical information ($I'_{inf2\ (x,y)}$) is less than a negative value of said threshold value (−S), setting the retrieved secondary numerical information ($I'_{inf2(x,y)}$) to a second digital value; and if the retrieved secondary numerical information $I'_{inf2\ (x,y)}$ is not greater than a predetermined threshold value (S) and less than the negative value of said threshold value (−S) setting the retrieved secondary numerical information ($I'_{inf2\ (x,y)}$) corresponding to one pixel (x, y) does not carry any hidden information.

26. The system of claim 24 wherein testing the secondary numerical information ($I'_{inf2}$) comprises the steps of;

determining that the hidden primary numerical information ($I_{inf1}$) is equal to 1 if the secondary numerical information ($I'_{inf2}$) is positive; and determining that the hidden primary numerical information ($I_{inf1}$) is equal to 0 if the secondary numerical information ($I'_{inf2}$) is negative.

27. A system for hiding a primary numerical information ($I_{inf1}$) inside an original document ($I_{orig}$) comprising:

a reference document ($I_{ref}$) generator connected to receive said original document ($I_{orig}$) for determining a reference document ($I_{ref}$) by means of a lossy approximation transformation method upon said original document ($I_{orig}$);

inf is a function that yields the lesser of the operators, sup is function that yields the greater of the operators, GAP is a gap image value for the pixels (x,y), and THRESHOLD is a predetermined threshold value.

28. The system of claim 27 wherein said secondary numerical information ($I_{inf2}$) generator computes said secondary numerical information ($I_{inf2(x,y)}$) according to the formula:

$$I_{inf2}(x,y) = inf(\text{GAP}, \text{THRESHOLD}) \text{ or } sup(\text{GAP}, \text{THRESHOLD}),$$

where:

numerical information $I'_{inf2}$ and deduces $I'_{inf1}$ as a function of a binary relationship between a gap difference and the primary numerical information ($I_{inf1}$).

29. The system of claim 28 wherein the secondary numerical information ($I_{inf2}$) generator sets the threshold value to null level so that the value secondary numerical information ($I_{inf2(x,y)}$) is selectively equal to the gap image value (GAP(x,y)) or the null level dependant on whether the pixel is carrying an information or not, thereby substantially moving the modified document ($I'_{orig}$) close to the original document ($I_{orig}$).

30. The system of claim 29 wherein said original document ($I_{orig}$) is a digitized image and that said lossy transformation method includes a set of coding transformation methods, said set of coding methods selected from the set of coding transformation methods consisting of a JPEG coding, a resolution reduction coding, or a fractal analysis coding.

31. The system according to claim 28 wherein secondary numerical information ($I_{inf2}$) generator determines said secondary numerical information ($I_{inf2}$) by the formula:

$$I_{inf2}(x,y) = -ABS(\text{GAP}/2) \text{ or } +ABS(\text{GAP}/2) \text{ whereby the primary numerical information } (I_{inf1}) \text{ is respectively equal to 0 or 1.}$$

32. The system of claim 27 wherein said original document ($I_{orig}$) is a digitized image and that said lossy transformation method includes a set of coding transformation methods, said set of coding transformation methods selected from the set of coding transformation methods consisting of a JPEG coding, a resolution reduction coding or a fractal analysis coding.

33. A system for extracting a primary numerical information ($I_{inf1}$) inside a modified document ($I'_{orig}$) comprising:

reference document ($I_{ref}$) generator connected to receive said modified document ($I'_{orig}$) and for performing a lossy approximation transformation method to said modified document ($I'_{orig}$) for determining a reference document ($I'_{ref}$);

a gap image device connected to receive the modified document ($I'_{orig}$) and in communication with the reference document ($I_{ref}$) generator to determine a gap image between said modified document ($I'_{orig}$) and said reference document ($I'_{ref}$);

a primary numerical information ($I_{inf1}$) device in communication with the gap image device to receive said gap image, said primary numerical information ($I_{inf1}$) device deducing the value of said primary numerical information ($I_{inf1}$) from a comparison between said gap image and a threshold value.

34. The system of claim 33 wherein the threshold value is zero and testing the secondary numerical information ($I'_{inf2}$) comprises the steps of;

determining that the hidden primary numerical information ($I_{inf1}$) is equal to 1 if the comparison between said gap image and the threshold value is positive; and determining that the hidden primary numerical information ($I_{inf1}$) is equal to 0 if the comparison between said gap image and a threshold value is negative.

35. A medium for retaining a computer program which, when executed by a computing system, performs a program process for hiding a primary numerical information ($I_{inf1}$) inside an initial numerical document ($I_{orig}$), said process comprising the steps of:

generating a numerical document of reference ($I_{ref}$) being a function of said initial numerical document ($I_{orig}$);

generating a gap image, said gap image being the difference between said initial numerical document ($I_{orig}$) and said numerical document of reference ($I_{ref}$);

generating a secondary numerical information ($I_{inf2}$) as a function of said gap image and said primary numerical information ($I_{ref}$) to hide said primary numerical information ($I_{inf1}$); and adding said secondary numerical information ($I_{inf2}$) to said numerical document of reference ($I_{ref}$) in order to obtain a modified initial numerical document ($I'_{orig}$) close to the initial numerical document ($I_{orig}$), said modified initial document having no visual distortion from hiding the primary numerical information ($I_{inf1}$).

36. The medium according to claim 35 wherein obtaining a value of each pixel of the modified initial document ($I'_{orig}$) is formed from the value computed in the numerical document of reference ($I_{ref}$) and the value given by the initial document ($I_{orig}$).

37. The medium of claim 36 wherein computing the numerical document of reference ($I_{ref}$) from the initial document ($I_{orig}$) comprises the step of executing a fractal transformation method, wherein said fractal transformation method comprises the steps of:

splitting the initial numerical document ($I_{orig}$) into a set of range primitives covering the whole initial document;

extracting from the initial numerical document ($I_{orig}$) a set of domain primitives, in order to create a basic codebook of domain primitives;

determining from the basic codebook of basic domain primitives a final codebook of additional domain primitives, by applying to the basic primitives, a set of local geometric and/or photometric transformations; and matching each basic range primitive with one domain primitive of the basic codebook, in such a way that each range primitive is equal to a transformed domain primitive via an elementary transformation, plus an error factor, which allows the primary numerical information ($I_{inf1}$) to be embedded, the image being composed by the set of range primitives computed from a domain primitive itself extracted from the final codebook (Dfinal) being said numeric document of reference ($I_{ref}$).

38. The medium of claim 37 wherein a program code which is associated with the fractal analysis is of a contractive type for determining said secondary numerical information ($I_{inf2}$) from said primary numerical information ($I_{inf1}$), wherein said program code executes a program process comprising the steps of:

calculating a the gap difference as a difference between the initial numerical document ($I_{orig}$) and an attractor (A), said attractor (A) being defined by a fractal code (W) associated to the initial numerical document ($I_{orig}$), computing for each point (x, y) of the initial numerical document ($I_{orig}$), the said secondary numerical information ($I_{inf2}$) from said gap difference and said primary numerical information ($I_{inf1}$);

establishing a binary link criterion between gap difference and said primary numerical information ($I_{inf1}$);

setting secondary numerical information ($I_{inf2}$) equal to said gap difference in response to a correspondence to said binary link criterion for each pixel; and disregarding primary numerical information ($I_{inf1}$) for each pixel if there is not correspondence to said binary link criterion.

39. The medium of claim 38 wherein the binary link criterion is determined by the formula:

If (GAP(x,y)<0 AND $I_{inf1}$(x,y)=0) OR (GAP(x,y)>0 AND $I_{inf1}$(x, y)=1)

THEN $I_{inf2}$(x,y)=GAP(x,y)

ELSE $I_{inf2}$(x,y)=0 where:

GAP(x,y) is the gap difference for a pixel having coordinates x, y, $I_{inf1}$ is the primary numerical information, $I_{inf2}$ is the secondary numerical information.

40. The medium of claim 35 wherein the initial numerical document ($I_{orig}$) is a multimedia document containing image data, textual data or image data of a logo of a company in gray levels.

41. A medium for retaining a computer program which, when executed by a computing system, performs a program process for extracting a primary numerical information $I_{inf1}$ from a modified initial numerical document ($I'_{orig}$) which is assumed to host a hidden primary numerical information $I_{inf1}$, said program process comprising the steps of:

computing a self-similarity code W' associated to the modified initial numerical document ($I'_{orig}$) by using a context utilized for computing said modified initial numerical document ($I'_{orig}$);

retrieving a secondary numerical information ($I'_{inf2}$) for each pixel from said modified initial numerical document ($I'_{orig}$) and a self-similarity code (W'), said retrieving comprising the step of:

computing secondary numerical information ($I'_{inf2}$) as a difference between modified initial numerical document ($I'_{orig}$) and an attactor (A'), said attractor (A') being defined by the self-similarity code (W') associated to the modified initial numerical document ($I'_{orig}$);

determining if said self-similarity code (W') is contractive;

if said self-similarity code (W') is contractive, testing the secondary numerical information $I'_{inf2}$ and deducing $I'_{inf1}$ as a function of a binary relationship between a gap difference and the primary numerical information ($I_{inf1}$).

42. The medium of claim 41 wherein the testing of said secondary numerical information ($I'_{inf2}$) comprises the step of:

computing from the retrieved secondary numerical information ($I'_{inf2}$), the primary numerical information $I'_{inf1}$ by the steps of:

if the retrieved secondary numerical information $I'_{inf2\ (x,y)}$ is greater than a predetermined threshold value (S), setting the secondary numerical information ($I'_{inf2(x,y)}$) to a first digital value;

if the retrieved secondary numerical information ($I'_{inf2\ (x,y)}$) is less than a negative value of said threshold value (−S), setting the retrieved secondary numerical information ($I'_{inf2(x,y)}$) to a second digital value; and if the retrieved secondary numerical information $I'_{inf2\ (x,y)}$ is not greater than a predetermined threshold value (S) and less than the negative value of said threshold value (−S) setting the retrieved secondary numerical information ($I'_{inf2\ (x,y)}$) corresponding to one pixel (x, y) does not carry any hidden information.

43. The medium of claim 41 wherein testing the secondary numerical information ($I'_{inf2}$) comprises the steps of;

determining that the hidden primary numerical information ($I_{inf1}$) is equal to 1 if the secondary numerical information ($I'_{inf2}$) is positive; and determining that the hidden primary numerical information ($I_{inf1}$) is equal to 0 if the secondary numerical information ($I'_{inf2}$) is negative.

44. A medium for retaining a computer program which, when executed by a computing system, performs a program process for hiding a primary numerical information ($I_{inf1}$) inside an original document ($I_{orig}$), said program process comprising the steps of:

determining a reference document $I_{ref}$ by means of a lossy approximation transformation method upon said original document ($I_{orig}$);

determining a gap image being equal to a difference between said original document ($I_{orig}$) and said reference document ($I_{ref}$);

determining a secondary numerical information ($I_{inf2}$) computed as a function of said gap image in accordance with a correspondence rule between said gap image and said primary numerical information ($I_{inf1}$); and adding said secondary numerical information ($I_{inf2}$) to said reference document ($I_{ref}$) in order to produce a modified document ($I'_{orig}$) substantially close to said original document ($I_{orig}$).

45. The medium of claim 44 wherein determining said secondary numerical information ($I_{inf2}$) comprising the step of computing said secondary numerical information ($I_{inf2(x,y)}$) according to the formula:

$$I_{inf2} = inf(GAP, THRESHOLD) \text{ or } sup(GAP, THRESHOLD),$$

where:

inf is a function that yields the lesser of the operators,
 sup is function that yields the greater of the operators,
 GAP is the gap image value, and
 THRESHOLD is a predetermined threshold value.

46. The medium of claim 44 comprising the steps of setting the threshold value to null level so that the value secondary numerical information ($I_{inf2}$) is selectively equal to the gap image value (GAP) or the null level dependant on whether the pixel is carrying an information or not, thereby substantially moving the modified document ($I'_{orig}$) close to the original document ($I_{orig}$).

47. The medium of claim 44 wherein determining said secondary numerical information ($I_{inf2}$) comprises the step of solving the formula:

$$I_{inf2} = -ABS(GAP/2) \text{ or } +ABS(GAP/2) \text{ whereby the primary numerical information } (I_{inf1}) \text{ is respectively equal to 0 or 1.}$$

48. The medium of claim 44 wherein said program process is applied to digitized images and that said lossy transformation method includes a set of coding transformation methods, said set of coding transformation methods selected from the set of coding transformation methods consisting of a JPEG coding, a resolution reduction coding, or a fractal analysis coding.

49. A medium for retaining a computer program which, when executed by a computing system, performs a program process for extracting a primary numerical information ($I_{inf1}$) inside a modified document ($I'_{orig}$), said program process comprising the steps of:

determining a reference document $I_{ref}$ by means of a lossy approximation method;

determining a gap image between said modified document ($I'_{orig}$) and said reference document ($I'_{ref}$); and deducing the value of said primary numerical information ($I_{inf1}$) from a comparison between said gap image and a threshold value.

50. The medium of claim 49 wherein the threshold value is zero and testing the secondary numerical information ($I'_{inf2}$) comprises the steps of;

determining that the hidden primary numerical information ($I_{inf1}$) is equal to 1 if the comparison between said gap image and the threshold value is positive; and determining that the hidden primary numerical information ($I_{inf1}$) is equal to 0 if the comparison between said gap image and a threshold value is negative.

51. The medium of claim 49 wherein said program process is applied to digitized images and that said lossy transformation method includes a set of coding transformation methods, said set of coding transformation methods selected from the set of coding transformation methods consisting of a JPEG coding, a resolution reduction coding, or a fractal analysis coding.

\* \* \* \* \*